US011081900B2

(12) United States Patent
Kanakasabai et al.

(10) Patent No.: US 11,081,900 B2
(45) Date of Patent: Aug. 3, 2021

(54) CHARGING PADS AND METHODS FOR CHARGING RECEIVER DEVICES HAVING DIFFERENT FREQUENCY STANDARDS

(71) Applicant: GENERAL ELECTRIC COMPANY, Schenectady, NY (US)

(72) Inventors: Viswanathan Kanakasabai, Karnataka (IN); Somakumar Ramachandrapanicker, Karnataka (IN); Arun Kumar Raghunathan, Karnataka (IN)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 16/469,525

(22) PCT Filed: Oct. 28, 2017

(86) PCT No.: PCT/US2017/058907
§ 371 (c)(1),
(2) Date: Jun. 13, 2019

(87) PCT Pub. No.: WO2018/111421
PCT Pub. Date: Jun. 21, 2018

(65) Prior Publication Data
US 2019/0326769 A1    Oct. 24, 2019

(30) Foreign Application Priority Data

Dec. 15, 2016   (IN) .............................. 201641042702

(51) Int. Cl.
*H02J 50/12*    (2016.01)
*H02J 50/40*    (2016.01)
*H02J 7/02*     (2016.01)

(52) U.S. Cl.
CPC .............. *H02J 7/025* (2013.01); *H02J 50/12* (2016.02); *H02J 50/40* (2016.02)

(58) Field of Classification Search
CPC .. H02J 7/025; H02J 50/12; H02J 50/40; H02J 50/10; H02J 7/00
See application file for complete search history.

(56) References Cited

U.S. PATENT DOCUMENTS

2016/0294221 A1   10/2016   Maniktala
2016/0322849 A1 *  11/2016   Yeh .......................... H01Q 7/00
(Continued)

FOREIGN PATENT DOCUMENTS

CN      105594089        5/2016
EP      0309201 A2       3/1989
(Continued)

OTHER PUBLICATIONS

"India Application No. 201641042702 Examination Report", dated Jan. 28, 2019, 6 pages.

(Continued)

*Primary Examiner* — Nghia M Doan
(74) *Attorney, Agent, or Firm* — DeLizio Law, PLLC.

(57) ABSTRACT

A charging pad includes a power drive unit and a transmitting unit. The power drive unit includes a first oscillator to generate a first AC voltage signal having a first frequency, and a first amplifier to amplify the first AC voltage signal. Also, the power drive unit includes a second oscillator to generate a second AC voltage signal having a second frequency, and a second amplifier to amplify the second AC voltage signal. Additionally, the power drive unit includes an adder to combine the amplified first AC voltage signal and the amplified second AC voltage signal. Furthermore, the transmitting unit includes a first frequency coil configured to transmit the amplified first AC voltage signal having the first (Continued)

frequency, and a second frequency coil configured to transmit the amplified second AC voltage signal having the second frequency.

20 Claims, 5 Drawing Sheets

(56)  References Cited

U.S. PATENT DOCUMENTS

2016/0322850 A1* 11/2016 Yeh ................... H04B 5/0037
2017/0170689 A1* 6/2017 Jeong ................. H04B 5/0037

FOREIGN PATENT DOCUMENTS

| FR | 2676297 A1 | 11/1992 |
| GB | 2253083 A | 8/1992 |
| WO | 97/00493 | 1/1997 |
| WO | 2018111421 | 6/2018 |

OTHER PUBLICATIONS

"PCT Application No. PCT/US2017/058907 International Preliminary Report on Patentability", dated Jun. 27, 2019, 11 pages.
"PCT Application No. PCT/US2017/058907 International Search Report and Written Opinion", dated Jan. 4, 2018, 12 pages.

* cited by examiner

CHARGING PADS AND METHODS FOR CHARGING RECEIVER DEVICES HAVING DIFFERENT FREQUENCY STANDARDS

CROSS-REFERENCE TO RELATED APPLICATIONS

This is a 35 U.S.C. 371 National Stage Patent Application of International Application No. PCT/US2017/058907 filed Oct. 28, 2017, which claims priority to Indian application 201641042702 filed Dec. 15, 2016, each of which is hereby incorporated by reference in its entirety.

BACKGROUND

Embodiments of the present specification relate generally to wireless power transfer and more particularly to charging pads and methods for charging receiver devices having different frequency standards.

In general, power transfer systems are used to transfer power from a power source to one or more receiver devices, such as for example, mobile devices, biomedical devices, and portable consumer devices. The power transfer systems are contact based power transfer systems or wireless power transfer systems. In the contact based power transfer systems, interconnecting wires are used to transfer power from the power source to the receiver devices. However, these interconnecting wires may damage or corrode over a period of time. Also, interconnecting wires of a contact based power transfer system add to the weight of the system. Consequently, the contact based power transfer systems are typically bulkier and heavier compared to their wireless counterparts. Thus, the wireless power transfer systems are desirable to transfer power from the power source to the receiver devices.

Typically, in a wireless power transfer system, a charging device is used to convert an input power to a transferable power that is transmitted to charge one or more batteries in the receiver devices. However, a given wireless power transfer system is configured to charge the receiver devices compatible with a particular wireless frequency standard. For example, the receiver devices may be compatible with one of the three wireless frequency standards defined by the Alliance for Wireless Power (A4WP), the Wireless Power Consortium (WPC), and the Power Matters Alliance (PMA). The WPC standard (Qi) is defined in a frequency range of 100 kHz to 200 kHz. The PMA standard is defined in a frequency range of 200 kHz to 400 kHz. Further, the A4WP standard is defined at a frequency of about 7 MHz. As will be appreciated, a conventional charging device is not configured to charge receiver devices operating at different frequency standards.

BRIEF DESCRIPTION

In accordance with one embodiment of the present specification, a charging pad configured to wirelessly transfer electrical power to a plurality of receiver devices is presented. The charging pad includes a power drive unit including a first oscillator configured to generate a first alternating current (AC) voltage signal having a first frequency, and a first amplifier coupled to the first oscillator and configured to amplify the first AC voltage signal having the first frequency. Also, the power drive unit includes a second oscillator configured to generate a second AC voltage signal having a second frequency, and a second amplifier coupled to the second oscillator and configured to amplify the second AC voltage signal having the second frequency. In addition, the power drive unit includes an adder configured to combine the amplified first AC voltage signal and the amplified second AC voltage signal. Furthermore, the charging pad includes a transmitting unit operatively coupled to the power drive unit and including at least one first frequency coil tuned to the first frequency and configured to receive at least a portion of the amplified first AC voltage signal from the combined voltage signal and transmit the amplified first AC voltage signal having the first frequency. Also, the transmitting unit includes at least one second frequency coil tuned to the second frequency and configured to receive at least a portion of the amplified second AC voltage signal from the combined voltage signal and transmit the amplified second AC voltage signal having the second frequency.

In accordance with another embodiment of the present specification, a charging pad configured to wirelessly transfer electrical power to a plurality of receiver devices is presented. The charging pad includes a power drive unit including an oscillator configured to generate a first AC voltage signal having a first frequency, and a bridge converter configured to convert a DC voltage signal into a second AC voltage signal having a second frequency. Also, the power drive unit includes an amplifier coupled to the oscillator and configured to amplify the first AC voltage signal having the first frequency. Further, the power drive unit includes a transformer operatively coupled to the amplifier and the bridge converter and configured to combine the amplified first AC voltage signal and the second AC voltage signal. In addition, the charging pad includes a transmitting unit operatively coupled to the power drive unit and including at least one first frequency coil tuned to the first frequency to transmit the amplified first AC voltage signal having the first frequency. Furthermore, the transmitting unit includes at least one second frequency coil tuned to the second frequency to transmit the second AC voltage signal having the second frequency.

In accordance with yet another embodiment of the present specification, a method for wirelessly transfer of electrical power to a plurality of receiver devices is presented. The method includes generating, by a first oscillator, a first AC voltage signal having a first frequency, and amplifying, by a first amplifier, the first AC voltage signal having the first frequency. Also, the method includes generating, by a second oscillator, a second AC voltage signal having a second frequency, and amplifying, by a second amplifier, the second AC voltage signal having the second frequency. Further, the method includes combining, by an adder, the amplified first AC voltage signal and the amplified second AC voltage signal. In addition, the method includes tuning at least one first frequency coil to the first frequency to transmit the amplified first AC voltage signal having the first frequency. Also, the method include tuning at least one second frequency coil to the second frequency to transmit the amplified second AC voltage signal having the second frequency.

In accordance with one another embodiment of the present specification, a method for wirelessly transfer of electrical power to a plurality of receiver devices is presented. The method includes generating, by an oscillator, a first AC voltage signal having a first frequency, and converting, by a bridge converter, a DC voltage signal into a second AC voltage signal having a second frequency. Also, the method includes amplifying, by an amplifier, the first AC voltage signal having the first frequency, and combining, by an adder, the amplified first AC voltage signal and the amplified second AC voltage signal. In addition, the method includes tuning at least one first frequency coil to the first frequency to transmit the amplified first AC voltage signal having the first frequency. Also, the method includes tuning at least one second frequency coil to the second frequency to transmit the amplified second AC voltage signal having the second frequency.

In accordance with one more embodiment of the present specification, a charging pad is presented. The charging pad includes a power drive unit including a first oscillator configured to generate a first AC voltage signal having a first frequency. Also, the power drive unit includes a second oscillator configured to generate a second AC voltage signal having a second frequency. Further, the power drive unit includes an adder operatively coupled to the first oscillator and the second oscillator, wherein the adder is configured to combine the first AC voltage signal and the second AC voltage signal, and amplify the combined voltage signal having the first frequency and the second frequency. Also, the charging pad includes a transmitting unit operatively coupled to the power drive unit and including at least one first frequency coil tuned to the first frequency and configured to receive the amplified combined voltage signal and transmit the first AC voltage signal having the first frequency. Furthermore, the transmitting unit includes at least one second frequency coil tuned to the second frequency and configured to receive the amplified combined voltage signal and transmit the second AC voltage signal having the second frequency.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for charging one or more wireless receiver devices are disclosed. In particular, the system and method disclosed herein employ a charging pad that is capable of driving different frequency coils enabling charging of the wireless receiver devices designed based on different frequency standards.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
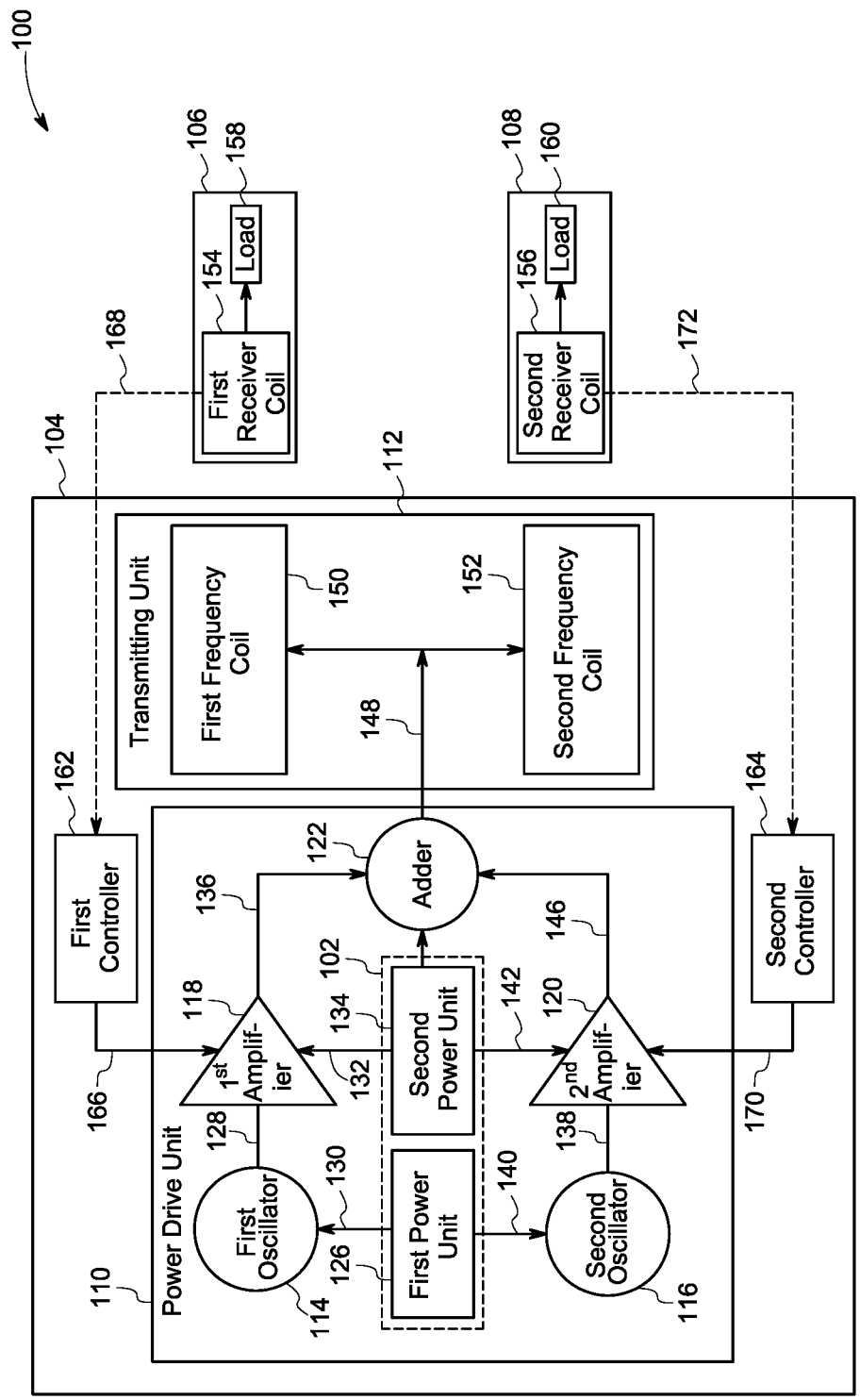
FIG. 1 is a diagrammatical representation of a wireless power transfer system, in accordance with an embodiment of the present specification.

FIG. 1 is a diagrammatical representation of a wireless power transfer system 100 in accordance with an embodiment of the present specification. The wireless power transfer system 100 is used to transmit an electrical power from a power source 102 to one or more receiver devices such as mobile devices, biomedical devices, and portable consumer devices. Particularly, in an automobile industry, a vehicle includes one or more charging pads that are used for supplying electrical power from the power source 102 to the mobile devices like cell phones, laptops, heating ventilation and air-conditioning (HVAC) units etc.

In the illustrated embodiment, the wireless power transfer system 100 includes a charging pad 104 that is wirelessly coupled to a first receiver device 106 and a second receiver device 108. The charging pad is configured to wirelessly transfer power to one or more receiver devices, such as devices 106 and 108. In one example, the charging pad 104 may be referred to as an electrical enclosure upon which the one or more receiver devices 106, 108 may be placed for charging one or more batteries in the corresponding receiver devices 106, 108. In one embodiment, the receiver devices 106, 108 may be positioned at a predetermined distance from the charging pad 104. In one example, the predetermined distance may be in a range from about 5 mm to 500 mm. It may be noted that the wireless power transfer system 100 is not limited to the first and second receiver devices 106, 108, and may include any number of receiver devices.

The first and second receiver devices 106, 108 may be compatible with one of the wireless frequency standards. For example, one of the receiver devices may be compatible with Alliance for Wireless Power (A4WP) standard that is defined at a frequency of about 7 MHz. Similarly, another receiver device may be compatible with Wireless Power Consortium (WPC) standard (Qi) that is defined in a frequency range of 100 kHz to 200 kHz. One of the receiver devices may be compatible with Power Matters Alliance (PMA) standard that is defined in a frequency range of 200 kHz to 400 kHz. One of the other receiver devices may be compatible with AIRFUEL™ standard that is defined at a frequency of about 6.7 MHz. For ease of understanding of the embodiment of the specification, the first receiver device 106 is assumed to be compatible with a first frequency standard such as AIRFUEL™ standard defined at a frequency of about 6.7 MHz. The first frequency standard may also be referred to as a high frequency standard. Similarly, the second receiver device 108 is assumed to be compatible with a second frequency standard such as WPC standard defined in a frequency range of 100 kHz to 200 kHz. The second frequency standard may also be referred to as a low frequency standard. It may be noted that the receiver devices 106, 108 may be of any frequency standard and are not limited to the frequency standards mentioned herein. Further, different receiver devices that are compatible with different frequency standards may be envisioned for charging.

In conventional power transfer systems, a single charging device is not configured to supply power to receiver devices at their corresponding frequency standards. Hence, separate charging devices having a dedicated converter and dedicated frequency coils for each frequency standard, are employed to supply power to the corresponding receiver device. However, using separate charging devices for each frequency standard may substantially increase set-up cost and maintenance cost of the conventional power transfer systems.

To overcome the above drawbacks associated with conventional systems, the exemplary power transfer system 100 includes the charging pad 104 that is configured to charge the receiver devices 106, 108 having different frequency standards. The charging pad 104 includes a single power drive unit 110 and a transmitting unit 112 that are used to wirelessly supply electrical power from the power source 102 to the first and second receiver devices 106, 108. In certain embodiments, the single power drive unit 110 may include one or more electrically coupled devices that have a single direct current (DC) or line frequency input. The power source 102 is configured to supply bias voltage and an input power having a DC voltage to the power drive unit 110. In some embodiments, the input power may be in a range from about 0.1 W to 200 W. In one example, the power source 102 may be an integral part of the power drive unit 110. In another example, the power source 102 may be situated external to the power drive unit 110. It may be noted that the power source 102 may include two power units 126 and 134, as illustrated, or may include a single power unit or three or more power units to supply power to the components of the power drive unit 110.

In certain embodiments, the power drive unit 110 includes a first oscillator 114, a second oscillator 116, a first amplifier 118, a second amplifier 120, and an adder 122. It may be noted that the power drive unit 110 may include two or more oscillators that are used for providing electrical power at one or more desired frequencies to the receiver devices 106, 108. Also, it may be noted that the power drive unit 110 may include other components, and is not limited to the components shown in FIG. 1.

Furthermore, the first and second oscillators 114, 116 are electrically coupled to a first power unit 126 in the power source 102. The first oscillator 114 is configured to generate a first alternating current (AC) voltage signal 128 having a first frequency. In one embodiment, the first AC signal may be a sine wave signal or a square wave signal. In another embodiment, the first AC signal may be a unipolar signal or a bipolar signal. Particularly, the first oscillator 114 is pre-tuned or designed to oscillate at the first frequency. Further, the first oscillator 114 receives a first bias voltage 130 from the first power unit 126 and oscillates at the first frequency to convert the received bias voltage 130 to the first AC voltage signal 128 having the first frequency. In one example, the first oscillator 114 may include at least one of a piezo-electric oscillator and an integrated circuit (IC)-based electronics oscillator. The first AC voltage signal 128 may be a low voltage signal that is in a voltage range from about 2 V to about 10 V. Also, the first frequency may be a high frequency that is in a frequency range from about 4 MHz to about 9 MHz.

Further, the first oscillator 114 transmits the first AC voltage signal 128 to the first amplifier 118 that is configured to amplify the first AC voltage signal 128. More specifically, the first amplifier 118 may receive an input power 132 from a second power unit 134 in the power source 102. In one example, the input power 132 may be in a range from about 0.1 W to 200 W. Further, the first amplifier 118 may buffer the first oscillator 114 and/or may increase an amplitude or magnitude of the first AC voltage signal 128. Further, the first amplifier 118 transmits the amplified first AC voltage signal 136 to the adder 122. The amplified first AC voltage signal 136 may be a high voltage signal that is in a voltage range from about 5 V to about 20 V.

In a similar manner, the second oscillator 116 is configured to generate a second AC voltage signal 138 having a second frequency. Particularly, the second oscillator 116 is pre-tuned or designed to oscillate at the second frequency. Further, the second oscillator 116 receives a second bias voltage 140 from the first power unit 126 and oscillates at the second frequency to convert the received bias voltage 140 to the second AC voltage signal 138 having the second frequency. In one example, the second oscillator 116 may include at least one of a piezo-electric oscillator and an integrated circuit (IC)-based electronics oscillator. The second AC voltage signal 138 may be a low voltage signal that is in a voltage range from about 2 V to about 10 V. Also, the second frequency may be lower than the first frequency. The second frequency may be in a frequency range from about 100 kHz to about 1 MHz.

Further, the second oscillator 116 transmits the second AC voltage signal 138 to the second amplifier 120 that is configured to amplify the second AC voltage signal 138. More specifically, the second amplifier 120 may receive the input power 142 from the second power unit 134. In one example, the input power may be in a range from about 0.1 W to 200 W. Further, the second amplifier 120 may increase an amplitude or magnitude of the second AC voltage signal 138 corresponding to the input power 142 received from the second power unit 134. Also, the second amplifier 120 transmits the amplified second AC voltage signal 146 to the adder 122. The amplified second AC voltage signal 146 may be a high voltage signal that is in a voltage range from about 5 V to about 20 V.

As depicted in FIG. 1, the amplified first AC voltage signal 136 and the amplified second AC voltage signal 146 are combined by the adder 122 to generate a combined voltage signal 148 having the first frequency and the second frequency. In one example, the combined signal may be a weighted addition of the amplified first and second AC voltage signals 136, 146. In another example, the amplified first AC voltage signal 136 having the first frequency (high frequency) may be used as a carrier signal to modulate the amplified second AC voltage signal 146 having the second frequency (low frequency). Further, the adder 122 transmits the combined or modulated voltage signal 148 having the first frequency and the second frequency to the transmitting unit 112. In one example, the adder 122 may include a power amplifier, high frequency transformers with secondary windings coupled in series, and a hybrid (H)-bridge pulse-width modulated circuit. In one embodiment, the first amplifier 118 and second amplifier 120 may receive the bias power only from the second power unit 134. Further, the adder 122 may be interfaced or coupled to the second power unit 134 to receive power that is used to drive the frequency coils 150, 152.

Moreover, the transmitting unit 112 includes one or more first frequency coils 150 and one or more second frequency coils 152 that are electrically coupled to the adder 122 of the power drive unit 110. In one embodiment, the first frequency coils 150 and the second frequency coils 152 may be stacked one above the other. In another embodiment, the first frequency coils 150 and the second frequency coils 152 may be positioned side-by-side on a same plane or on a different plane. Further, the first frequency coils 150 are inductively coupled to a first receiver coil 154 in the first receiver device 106. Similarly, the second frequency coils 152 are inductively coupled to a second receiver coil 156 in the second receiver device 108. It may be noted that the transmitting unit 112 may include different frequency coils that are compatible with different frequency standards, and is not limited to two frequency coils 150, 152.

Further, the first frequency and second frequency coils 150, 152 are used to wirelessly transmit the amplified first AC voltage signal 136 having the first frequency or the amplified second AC voltage signal 146 having the second frequency to the first and second receiver devices 106, 108, respectively. Particularly, the first frequency coils 150 may receive the combined voltage signal 148 having the first frequency and the second frequency from the adder 122. However, the first frequency coils 150 are tuned to the first frequency to transmit the amplified first AC voltage signal 136 having the first frequency to the first receiver device 106. In one example, the first frequency coil 150 along with a capacitor (not shown in FIG. 1) may form a resonant path or a LC circuit that is tuned to resonate at the first frequency to transmit the amplified first AC voltage signal 136 corresponding to the first frequency to one or more first receiver coils 150 in the first receiver device 106.

In a similar manner, the second frequency coils 152 may receive the combined voltage signal 148 having the first frequency and the second frequency. However, the second frequency coils 152 are tuned to the second frequency to transmit the amplified second AC voltage signal 146 having the second frequency to the second receiver device 108. More specifically, the second frequency coil 152 along with a capacitor (not shown in FIG. 1) may form a resonant path or a LC circuit that is tuned to resonate at the second frequency to transmit the amplified second AC voltage signal 146 corresponding to the second frequency to one or more second receiver coils 156 in the second receiver device 108.

Further, the first and second receiver devices 106, 108 are configured to use the amplified first AC voltage signal having the first frequency or the amplified second AC voltage signal having the second frequency for charging one or more loads 158, 160 of the first and second receiver devices 106, 108. In one example, the loads 158, 160 may include batteries that are used to supply power to the receiver devices 106, 108. In one embodiment, the first and second receiver devices 106, 108, such as mobile phones and laptops may be inductively coupled to the first frequency coils 150 and/or the second frequency coils 152 based on the frequency standards for which the first and second receiver devices 106, 108 are designed. For example, if the first receiver device 106 is designed or configured to be compatible with the first frequency standard such as AIRFUEL™ standard, the first receiver coil 154 in the first receiver device 106 receives the amplified first AC voltage signal having the first frequency from the first frequency coils 150. Similarly, if the second receiver device 108 is designed or configured to be compatible with the second frequency standard such as WPC standard, the second receiver coil in the second receiver device 108 receives the amplified second AC voltage signal having the second frequency from the second frequency coils 152. In one example, the first and second receiver devices 106, 108 may be placed on the charging pad 104 for charging the batteries 158, 160 in the first and second receiver devices 106, 108.

In one embodiment, the charging pad 104 may include a first controller 162 and a second controller 164. The first controller 162 is electrically coupled to the first amplifier 118, while the second controller 164 is electrically coupled to the second amplifier 120. Further, the first controller 162 may send a first control signal 166 to the first amplifier 118 to control a voltage gain of the first amplifier 118. Particularly, the first controller 162 may be wirelessly coupled to the first receiver device 106 to receive a first feedback signal 168 that is representative of an output voltage across the load 158. Further, the first controller 162 may send the first control signal 166 corresponding to the feedback signal 168 to control the voltage gain of the first amplifier 118, which in turn controls or regulates the output voltage across the load 158.

In a similar manner, the second controller 164 may send a second control signal 170 to the second amplifier 120 to control a voltage gain of the second amplifier 120. Particularly, the second controller 164 may be wirelessly coupled to the second receiver device 108 to receive a second feedback signal 172 that is representative of an output voltage across the load 160. Further, the second controller 164 may send the second control signal 170 corresponding to the feedback signal 172 to control the voltage gain of the second amplifier 120, which in turn controls or regulates the output voltage across the load 160. In one embodiment, the charging pad may include a single controller that may be electrically coupled to the first and second amplifiers 118, 120 to control the voltage gain of the first and second amplifiers 118, 120.

Thus, by employing the exemplary wireless power transfer system 100, the receiver devices 106 and 108 having different frequency standards can be charged. The charging of the receiver devices 106 and 108 may be conducted simultaneously, sequentially, or in any other order as desired. In operation, the power drive unit 110 of the charging pad 104 drives the first frequency coils 150 and the second frequency coils 152 to transfer the power from the power source 102 to the receiver devices 106, 108 of different frequency standards.

Figure 2:
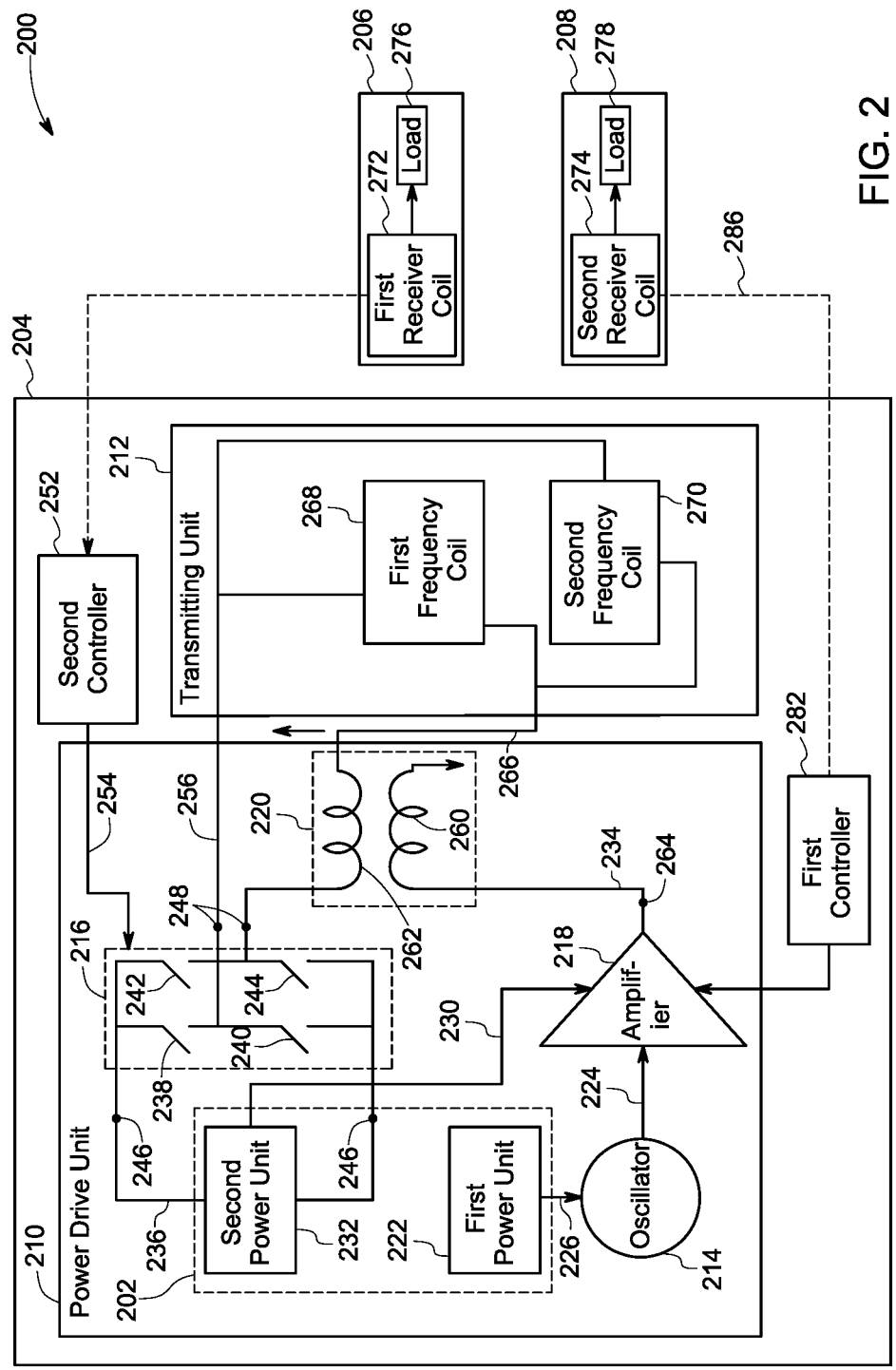
FIG. 2 is a diagrammatical representation of a wireless power transfer system, in accordance with another embodiment of the present specification.

Referring to FIG. 2, a diagrammatical representation of a wireless power transfer system 200 in accordance with another embodiment of the present specification is depicted. The wireless power transfer system 200 is used to transmit an electrical power from a power source 202 to one or more receiver devices 206, 208. In the illustrated embodiment, the wireless power transfer system 200 includes a charging pad 204 that is wirelessly coupled to a first receiver device 206 and a second receiver device 208. The charging pad 204 may be referred to as an electrical enclosure upon which the one or more receiver devices 206, 208 may be placed for charging one or more batteries in the corresponding receiver devices 206, 208. Further, in addition to direct contact achieved between the charging pad 204 and one or more received devices 206 and 208, in some embodiments, the receiver devices 206, 208 may not be in physical contact with the charging pad 204. In some of these embodiments, one or both of the receiver devices 206, 208 may be positioned at a determined distance from the charging pad 204. In one example, the determined distance may be in a range from about 5 mm to 500 mm.

Further, the charging pad 204 includes a power drive unit 210 and a transmitting unit 212 that are used for supplying electrical power from the power source 202 to the receiver devices 206, 208. The power source 202 is configured to supply bias voltage and an input power having a DC voltage signal to the power drive unit 210. In some embodiments, the input power may be in a range from about 0.1 W to 200 W. In one example, the power source 202 may be a part of the power drive unit 210. In another example, the power source 202 may be positioned external to the power drive unit 210.

In the exemplary embodiment, the power drive unit 210 includes an oscillator 214, a bridge converter 216, an amplifier 218, and a transformer 220. It may be noted that the power drive unit 210 may include other components, and is not limited to the components shown in FIG. 2. Further, the oscillator 214 is electrically coupled to a first power unit 222 in the power source 202. The oscillator 214 is configured to generate a first alternating current (AC) voltage signal 224 having a first frequency. Particularly, the oscillator 214 is pre-tuned or designed to oscillate at the first frequency. Further, the oscillator 214 receives a bias voltage 226 from the first power unit 222 and oscillates at the first frequency to generate the first AC voltage signal 224 having the first frequency. In one example, the oscillator 214 may include a piezo-electric oscillator and an integrated circuit (IC)-based electronics oscillator. The first AC voltage signal 224 may be a low voltage signal that is in a voltage range from about 2 V to about 10 V. Also, the first frequency is in a frequency range from about 4 MHz to about 9 MHz.

Further, the oscillator 214 transmits the first AC voltage signal 224 to the amplifier 218 that is configured to amplify the first AC voltage signal 224. More specifically, the amplifier 218 may receive the input power 230 from a second power unit 232. In one example, the input power may be in a range from about 0.1 W to 200 W. Further, the amplifier 218 may increase an amplitude of the first AC voltage signal 224 corresponding to the input power 230 received from the second power unit 232. Further, the amplifier 218 transmits the amplified first AC voltage signal 234 to the transformer 220. The amplified first AC voltage signal 224 may be a high voltage signal that is in a voltage range from about 5 V to about 20 V.

In one embodiment, the charging pad 204 may include a first controller 282 that is electrically coupled to the amplifier 218. Further, the first controller 282 may send a first control signal 284 to the amplifier 218 to control a voltage gain of the amplifier 218. In one example, the first controller 282 may be wirelessly coupled to the second receiver device 208 to receive a first feedback signal 286 that is representative of an output voltage across a load 278 in the second receiver device 208. Further, the first controller 282 may send the first control signal 284 corresponding to the first feedback signal 286 to control the voltage gain of the amplifier 218, which in turn controls or regulates the output voltage across the load 278.

Furthermore, the bridge converter 216 is electrically coupled to the second power unit 232 of the power source 202 and configured to receive the input power 236 having the DC voltage, from the second power unit 232. In certain embodiments, the bridge converter 216 includes an electrically coupled device that has a single DC input. Further, the bridge converter 216 is configured to convert the DC voltage of the input power 236 into a second AC voltage signal 256 having a second frequency. In the embodiment of FIG. 2, the bridge converter 216 includes a first switch 238, a second switch 240, a third switch 242, and a fourth switch 244 that are arranged to form an inverter circuit. These switches 238-244 are electrically coupled between input terminals 246 and output terminals 248 of the bridge converter 216. In one embodiment, the switches 238-244 may include electronic switches such as metal-oxide-semiconductor field-effect transistors (MOSFETs) or insulated-gate bipolar transistors (IGBTs). It may be noted that the switches 238-244 may include other semiconductor switches and are not limited to MOSFETs and IGBTs. Further, operations of the first and fourth switches 238, 244 and the second and third switches 240, 242 are dependent on one another. For example, if the first switch 238 is activated for a time duration $T_{on}$, the second switch 240 is deactivated for this time duration $T_{on}$. Similarly, if the second switch 240 is activated for the time duration $T_{off}$, the first switch 238 is deactivated for this time duration $T_{off}$.

A second controller 252 is electrically coupled to the bridge converter 216 to send switching signals 254 to the switches 238-244 in the bridge converter 216. In one example, the switching signals 254 may have a low switching pulse frequency of about 150 kHz. These switching signals 254 are used to activate and deactivate the switches 238-244 based on a switching frequency of the switching signals 254 to convert the DC voltage of the input power 236 to the second AC voltage signal 256 having the second frequency. In one embodiment, the second controller 252 may vary the switching frequency or a duty ratio of the switching signals 254 to regulate the second AC voltage signal 256. In one example, the second controller 252 may vary the time duration $T_{on}$ and $T_{off}$ of the switches 238-244 to vary the duty ratio of the switching signals 254, which in turn regulates the second AC voltage signal 256. The second AC voltage signal 256 may be a high voltage signal that is in a voltage range from about 2 V to about 10 V. Also, the second frequency may be in a frequency range from about 100 kHz to about 1 MHz. The bridge converter 216 transmits the second AC voltage signal 256 having the second frequency.

Further, the transformer 220 includes a first winding 260 and a second winding 262 that are magnetically coupled to each other. The first winding 260 is coupled to an output terminal 264 of the amplifier 218 to receive the amplified first AC voltage signal 234 having the first frequency. Further, the first AC voltage signal 234 is transmitted from the first winding 260 to the second winding 262 of the transformer 220. Also, the second winding 262 is coupled to the output terminals 248 of the bridge converter 216 to receive the second AC voltage signal 256 having the second frequency. More specifically, the transformer 220 is configured to combine the second AC voltage signal 256 and the amplified first voltage signal 234 to generate a combined voltage signal 266 having the first frequency and the second frequency. In one example, the combined voltage signal 266 may be representative of a voltage across the transmitting unit 212.

The transmitting unit 212 includes one or more first frequency coils 268 and one or more second frequency coils 270 that are electrically coupled to the transformer 220 in the power drive unit 210. Further, the one or more first frequency coils 268 are inductively coupled to a first receiver coil 272 in the first receiver device 206. One or more second frequency coils 270 are inductively coupled to a second receiver coil 270 in the second receiver device 208.

Further, the first and second frequency coils 268, 270 are used to wirelessly transmit the first AC voltage signal or the second AC voltage signal to the first and second receiver devices 206, 208, respectively. Particularly, the first frequency coils 268 may receive the combined voltage signal 266 having the first frequency and the second frequency. However, the first frequency coils 268 are tuned to the first frequency to transmit the amplified first AC voltage signal having the first frequency to the first receiver device 206. More specifically, the first frequency coils 268 along with a capacitor may form a resonant path or a LC circuit that is tuned to resonate at the first frequency to transmit the first AC voltage signal having the first frequency to the first receiver coil 272 in the first receiver device 206.

In a similar manner, the second frequency coils 270 may receive the combined voltage signal 266 having the first frequency and the second frequency. However, the second frequency coils 270 are tuned to the second frequency to transmit the second AC voltage signal having the second frequency to the second receiver device 208. More specifically, the second frequency coils 270 along with a capacitor may form a resonant path or a LC circuit that is tuned to resonate at the second frequency to transmit the second AC voltage signal having the second frequency to the second receiver coil 274 in the second receiver device 208.

Further, the first and second receiver devices 206, 208 are configured to use the first AC voltage signal having the first frequency or the second AC voltage signal having the second frequency for charging one or more loads 276, 278 included in the first and second receiver devices 206, 208. In one example, the loads 276, 278 may include batteries that are used for supply power to the receiver devices 206, 208. In one embodiment, the first and second receiver devices 206, 208 such as mobile phones and laptops may be inductively coupled to the first frequency coils 268 and/or the second frequency coils 270 based on the frequency standards for which the first and second receiver devices 206, 208 are designed. For example, if the first receiver device 206 is designed or configured to be compatible with the first frequency standard such as AIRFUEL™ standard, the first receiver device 206 receives the first AC voltage signal having the first frequency from the first frequency coils 268. Similarly, if the second receiver device 208 is designed or configured to be compatible with the second frequency standard such as WPC standard, the second receiver device 208 receives the second AC voltage signal having the second frequency from the second frequency coils 270. In one example, the first and second receiver devices 206, 208 may be placed on the charging pad 204 for charging the batteries 276, 278 in the first and second receiver devices 206, 208.

Thus, by employing the exemplary wireless power transfer system 200, the receiver devices 206 and 208 having different frequency standards can be charged. The charging of the receiver devices 206 and 208 may be conducted simultaneously, sequentially, or in any other order as desired. In operation, the power drive unit 210 of the charging pad 204 drives the first frequency coils 268 and the second frequency coils 270 to transfer the power from the power source 202 to the receiver devices 206, 208 of different frequency standards.

Figure 3:
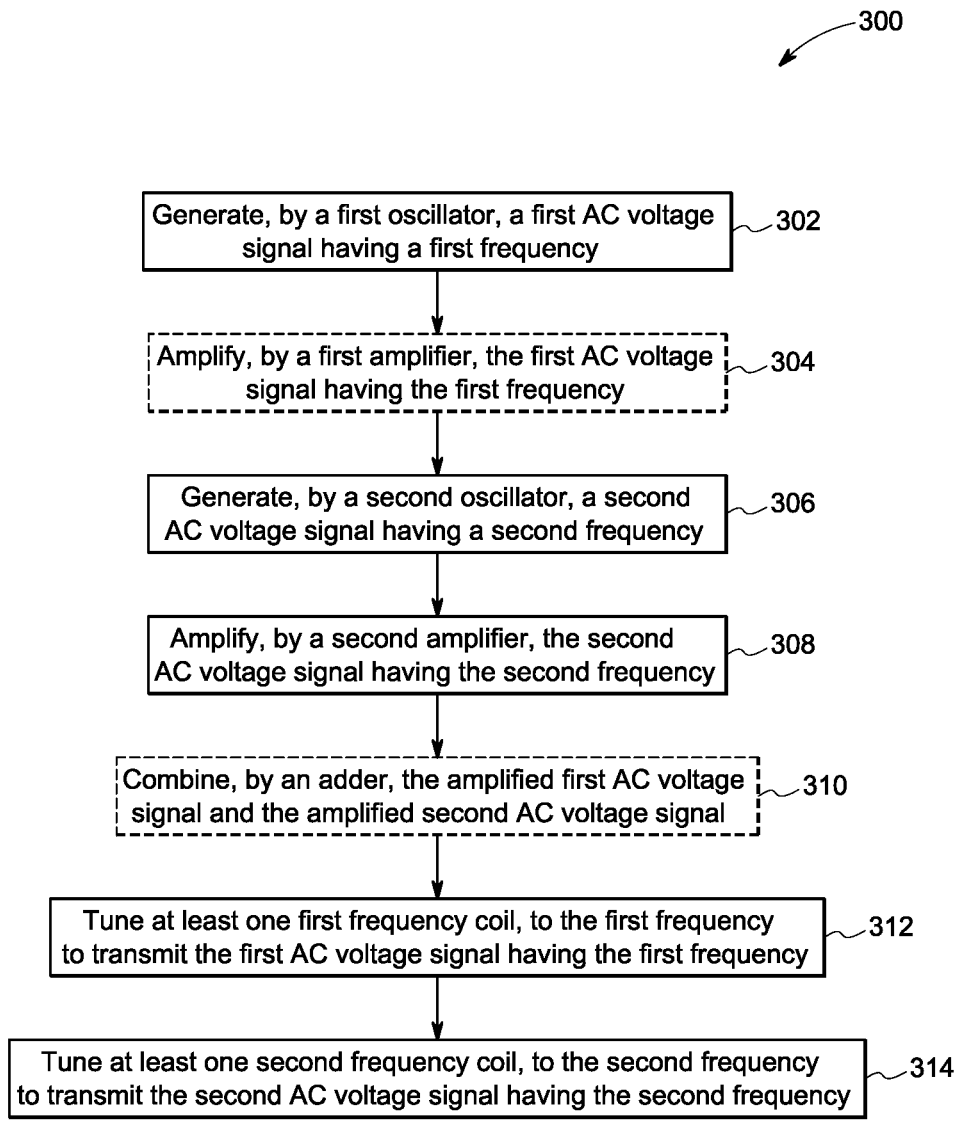
FIG. 3 is a flow chart illustrating a method for charging a plurality of receiver devices, in accordance with an embodiment of the present specification.

Referring to FIG. 3, a flow chart illustrating a method for charging a plurality of receiver devices in accordance with an embodiment of the present specification is depicted. The method 300 is described with reference to the components of FIG. 1. The method 300 begins at block 302, where a first AC voltage signal 128 having a first frequency is generated. To that end, a first oscillator 114 receives a first bias voltage 130 from the first power unit 126 and oscillates at the first frequency to generate the first AC voltage signal 128 having the first frequency. Further, the first oscillator 114 transmits the first AC voltage signal 128 to the first amplifier 118.

Subsequently, at block 304, the first AC voltage signal 128 having the first frequency is amplified by a first amplifier 118. More specifically, the first amplifier 118 may receive an input power 132 from a second power unit 134 in the power source 102. Further, the first amplifier 118 may increase an amplitude or magnitude of the first AC voltage signal 128 corresponding to the input power 132 received from the second power unit 134. Further, the first amplifier 118 transmits the amplified first AC voltage signal 136 to the adder 122.

Furthermore, at block 306, a second AC voltage signal 138 having a second frequency is generated. To that end, a second oscillator 116 receives a second bias voltage 140 from the first power unit 126 and oscillates at the second frequency to generate the second AC voltage signal 138 having the second frequency. Further, the second oscillator 116 transmits the second AC voltage signal 138 to the second amplifier 120.

Additionally, at block 308, the second AC voltage signal 138 having the second frequency is amplified by a second amplifier 120. More specifically, the second amplifier 120 may receive the input power 142 from the second power unit 134. Further, the second amplifier 120 may increase an amplitude or magnitude of the second AC voltage signal 138 corresponding to the input power 142 received from the second power unit 138. Also, the second amplifier 120 transmits the amplified second AC voltage signal 146 to the adder 122.

Subsequently, at block 310, the amplified first AC voltage signal 136 and the amplified second AC voltage signal 146 are combined. To that end, the adder 122 is configured to receive and combine the amplified first AC voltage signal 136 and the amplified second AC voltage signal 146 to generate a combined voltage signal 148 having the first frequency and the second frequency. In one alternate embodiment, the adder 122 is configured to receive the first AC voltage signal 128 from the first oscillator 114 and the second AC voltage signal 138 from the second oscillator 116. Also, the adder 122 combines the first AC voltage signal 128 and the second AC voltage signal 138 to generate a combined voltage signal having the first frequency and the second frequency. Further, the adder 122 amplifies this combined voltage signal and transmits the amplified combined voltage signal to the transmitting unit 112. In one example, the adder 122 may transmit the combined voltage signal to an external amplifier that amplifies and transmits the amplified combined voltage signal to the transmitting unit 112.

Further, at block 312, at least one first frequency coil 150 is tuned to the first frequency to transmit the amplified first AC voltage signal having the first frequency. Particularly, the first frequency coil 150 may receive the combined voltage signal 148 having the first frequency and the second frequency. However, the first frequency coil 150 is tuned to the first frequency to transmit the amplified first AC voltage signal 136 having the first frequency to the first receiver device 106.

Additionally, at block 314, at least one second frequency coil is tuned to the second frequency to transmit the amplified second AC voltage signal 146 having the second frequency. Particularly, the second frequency coil 152 may receive the combined voltage signal 148 having the first frequency and the second frequency. However, the second frequency coil 152 is tuned to the second frequency to transmit the amplified second AC voltage signal 146 having the second frequency to the second receiver device 108.

Thus, by employing the exemplary method 300, power is transferred from the power source 102 to the receiver devices 106, 108 that are compatible with different frequency standards.

Figure 4:
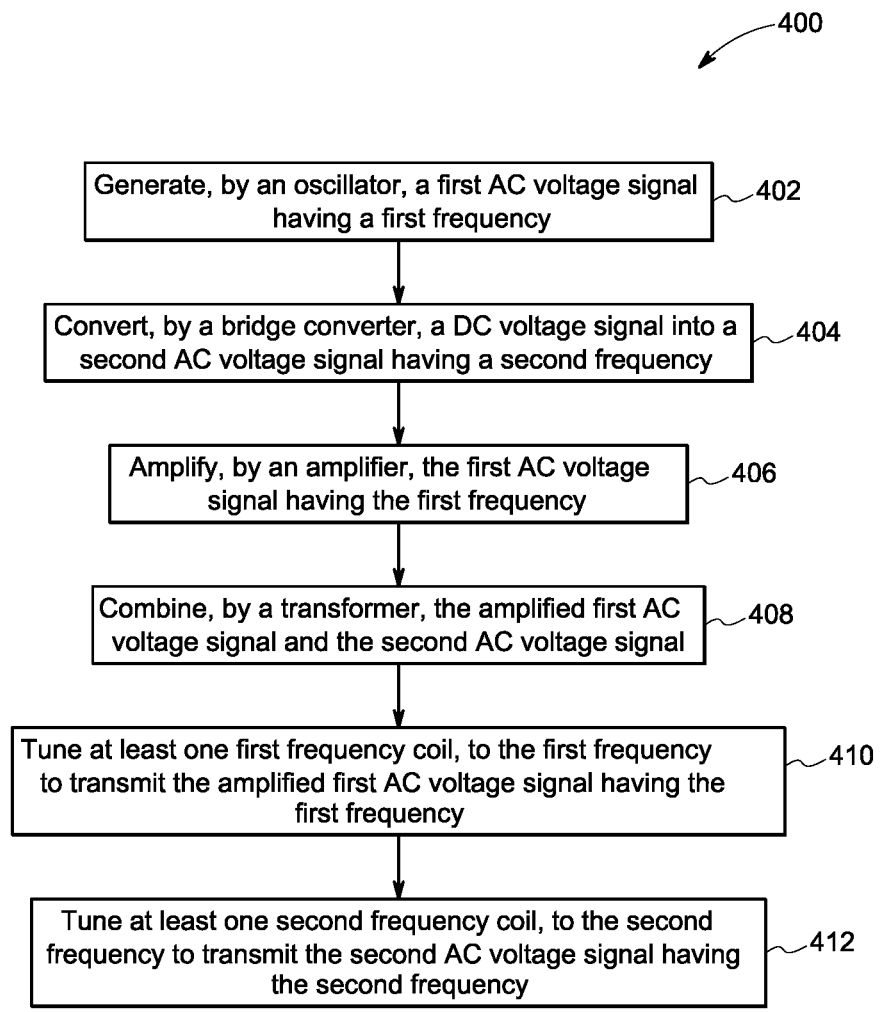
FIG. 4 is a flow chart illustrating a method for charging a plurality of receiver devices, in accordance with another embodiment of the present specification.

Referring to FIG. 4, a flow chart illustrating a method for charging a plurality of receiver devices in accordance with another embodiment of the present specification is depicted. The method 400 is described with reference to the components of FIG. 2. The method 400 begins at block 402, where a first AC voltage signal 224 having a first frequency is generated. To that end, the oscillator 214 receives a bias voltage 226 from the first power unit 222 and oscillates at the first frequency to generate the first AC voltage signal 224 having the first frequency.

Subsequently, at block 404, a DC voltage signal is converted into a second AC voltage signal having a second frequency. Particularly, a bridge converter 216 is configured to convert the DC voltage signal of the input power 236 into the second AC voltage signal 256 having a second frequency.

Furthermore, at block 406, the first AC voltage signal having the first frequency is amplified by an amplifier 218 in the power drive unit 210. More specifically, the amplifier 218 may increase an amplitude of the first AC voltage signal 224 corresponding to the input power 230 received from the second power unit 232. Further, the amplifier 218 transmits the amplified first AC voltage signal 234 to the transformer 220.

Additionally, at block 408, the amplified first AC voltage signal 234 and the second AC voltage signal 256 are combined by using the transformer 220. More specifically, the transformer 220 is configured to combine the amplified first AC voltage signal 234 with an output of the bridge converter 216 having the second AC voltage signal 256 to generate a combined voltage signal 266 having the first frequency and the second frequency. Further, the transformer 220 is configured to transmit the combined voltage signal 266 to the transmitting unit 212.

Further, at block 410, at least one first frequency coil 268 is tuned to the first frequency to transmit the amplified first AC voltage signal 234 having the first frequency. Particularly, the first frequency coil 268 may receive the combined voltage signal 266 having the first frequency and the second frequency. Further, the first frequency coil 268 is tuned to the first frequency to transmit the amplified first AC voltage signal 234 having the first frequency to the first receiver device 206.

Also, at block 412, at least one second frequency coil is excited at the second frequency to transmit the second AC voltage signal having the second frequency. Particularly, the second frequency coil 270 may receive the combined voltage signal 266 having the first frequency and the second frequency. Further, the second frequency coil 270 is tuned to the second frequency to transmit the second AC voltage signal 256 having the second frequency to the second receiver device 208.

Thus, by employing the exemplary method 400, power is transferred from the power source 202 to the receiver devices 206, 208 that are compatible with different frequency standards.

Figure 5:
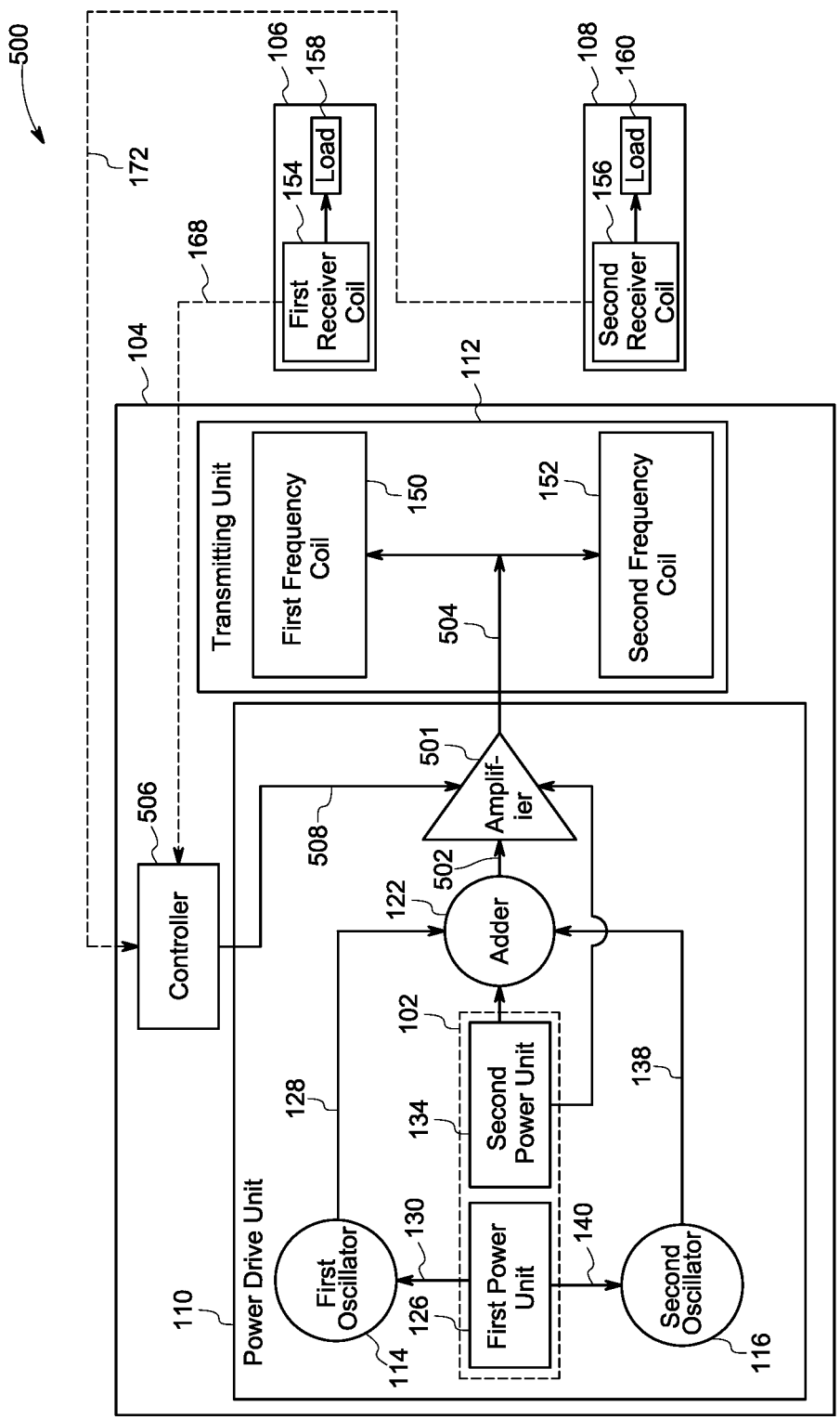
FIG. 5 is a diagrammatical representation of a wireless power transfer system, in accordance with one embodiment of the present specification.

Referring to FIG. 5, a diagrammatical representation of a wireless power transfer system 500, in accordance with one embodiment of the present specification is depicted. The wireless power transfer system 500 is similar to the wireless power transfer system 100 of FIG. 1. However, in the embodiment of FIG. 5, an amplifier 501 is positioned after the adder 122. In particular, the first oscillator 114 generates the first AC voltage signal 128 having the first frequency, while the second oscillator 116 generates the second AC voltage signal 138 having the second frequency. Also, the first and second AC voltage signals 128, 138 are transmitted from the first and second oscillators 114, 116 to the adder 122. Further, the adder 122 is configured to combine the first AC voltage signal and the second AC voltage signal to generate a combined voltage signal 502 having the first frequency and the second frequency. Further, the adder 122 transmits the combined voltage signal 502 to the amplifier 504, where the combined voltage signal is amplified and transmitted to the transmitting unit 112. In one embodiment, the adder 122 may be configured to amplify the combined voltage signal and transmit the amplified combined voltage signal to the transmitting unit 112.

At the transmitting unit 112, the first frequency coils 150 may receive the amplified combined voltage signal 504 having the first frequency and the second frequency from the adder 122. However, the first frequency coils 150 are tuned to the first frequency to transmit the first AC voltage signal 128 having the first frequency to the first receiver device 106. In a similar manner, the second frequency coils 152 may receive the amplified combined voltage signal 504 having the first frequency and the second frequency. However, the second frequency coils 152 are tuned to the second frequency to transmit the second AC voltage signal 138 having the second frequency to the second receiver device 108.

Further, in the exemplary embodiment, the charging pad 104 includes a controller 506, which is a single controller, that is electrically coupled to the amplifier 501. Further, the controller 506 may send a control signal 508 to the amplifier 501 to control a voltage gain of the amplifier 501. Particularly, the single controller 506 may be wirelessly coupled to the first and second receiver devices 106, 108 to receive a first and second feedback signals 168, 172 that are representative of an output voltage across the loads 158, 160 respectively. Further, the controller 506 may send the control signal 508 corresponding to the feedback signals 168, 172 to control the voltage gain of the amplifier 501, which in turn controls or regulates the output voltage across the loads 158, 160.

In accordance with the exemplary embodiments discussed herein, the exemplary system and method facilitate to charge the receiver devices of any frequency standard, using the charging pad. As a single charging pad is used to charge the receiver devices of different frequency standards, set-up cost and maintenance cost of the power transfer systems may be substantially reduced.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A charging pad configured to wirelessly transfer electrical power to a plurality of receiver devices, wherein the charging pad comprises:
    a power drive unit comprising:
        a first oscillator configured to generate a first alternating current voltage signal having a first frequency;
        a first amplifier coupled to the first oscillator and configured to amplify the first AC voltage signal having the first frequency;
        a second oscillator configured to generate a second AC voltage signal having a second frequency;
        a second amplifier coupled to the second oscillator and configured to amplify the second AC voltage signal having the second frequency; and an adder configured to combine the amplified first AC voltage signal and the amplified second AC voltage signal to produce a combined voltage signal; and a transmitting unit operatively coupled to the power drive unit and comprising:

at least one first frequency coil tuned to the first frequency and configured to receive at least a portion of the amplified first AC voltage signal from the combined voltage signal and transmit the amplified first AC voltage signal having the first frequency; and at least one second frequency coil tuned to the second frequency and configured to receive at least a portion of the amplified second AC voltage signal from the combined voltage signal and transmit the amplified second AC voltage signal having the second frequency.

2. The charging pad of claim 1, further comprising a first power unit operatively coupled to the first oscillator and the second oscillator and configured to supply a first bias voltage to the first oscillator and the second oscillator.

3. The charging pad of claim 1, further comprising a second power unit operatively coupled to the first amplifier and the second amplifier and configured to supply a second bias voltage to the first amplifier and the second amplifier.

4. The charging pad of claim 1, wherein the adder is configured to combine the amplified first AC voltage signal and the amplified second AC voltage signal to generate the combined voltage signal comprising the first frequency and the second frequency.

5. The charging pad of claim 4, wherein the adder is further configured to transmit the combined voltage signal to the at least one first frequency coil and the at least one second frequency coil.

6. The charging pad of claim 5, wherein the at least one first frequency coil is configured to receive the combined voltage signal and resonate at the first frequency to transmit the amplified first AC voltage signal having the first frequency to a first receiver coil of a first receiver device.

7. The charging pad of claim 6, further comprising a first controller operatively coupled to the first receiver coil and the first amplifier, wherein the first controller is configured to control a voltage gain of the first amplifier.

8. The charging pad of claim 5, wherein the at least one second frequency coil is configured to receive the combined voltage signal and resonate at the second frequency to transmit the amplified second AC voltage signal having the second frequency to a second receiver coil of a second receiver device.

9. The charging pad of claim 8, further comprising a second controller operatively coupled to the second receiver coil and the second amplifier, wherein the second controller is configured to control a voltage gain of the second amplifier.

10. A charging pad configured to wirelessly transfer electrical power to a plurality of receiver devices, wherein the charging pad comprises:

a power drive unit comprising:

an oscillator configured to generate a first AC voltage signal having a first frequency;

a bridge converter configured to convert a DC voltage signal into a second AC voltage signal having a second frequency;

an amplifier coupled to the oscillator and configured to amplify the first AC voltage signal having the first frequency; and a transformer operatively coupled to the amplifier and the bridge converter and configured to combine the amplified first AC voltage signal and the second AC voltage signal; and a transmitting unit operatively coupled to the power drive unit and comprising:

at least one first frequency coil tuned to the first frequency to transmit the amplified first AC voltage signal having the first frequency; and at least one second frequency coil tuned to the second frequency to transmit the second AC voltage signal having the second frequency.

11. The charging pad of claim 10, further comprising a first power unit operatively coupled to the oscillator and configured to supply a bias voltage to the oscillator to generate the first AC voltage signal.

12. The charging pad of claim 10, further comprising a second power unit operatively coupled to the bridge converter and configured to supply an input power having the DC voltage signal to the bridge converter.

13. The charging pad of claim 12, wherein the second power unit is operatively coupled to the amplifier and configured to supply the second bias voltage signal to the amplifier to amplify the first AC voltage signal.

14. The charging pad of claim 10, wherein the transformer comprises:

a first winding coupled to the oscillator and configured to receive the amplified first AC voltage signal; and a second winding coupled to the bridge converter and configured to receive the second AC voltage signal.

15. The charging pad of claim 14, wherein the transformer is configured to combine the amplified first AC voltage signal and the second AC voltage signal to generate a combined voltage signal having the first frequency and the second frequency, wherein the combined voltage signal is received by the at least one first frequency coil and the at least one second frequency coil.

16. The charging pad of claim 15, wherein the at least one first frequency coil is configured to receive the combined voltage signal and resonate at the first frequency to transmit the amplified first AC voltage signal having the first frequency to a first receiver device of the plurality of receiver devices.

17. The charging pad of claim 16, further comprising a second controller operatively coupled to the first receiver device and the bridge converter, wherein the second controller is configured to vary a switching frequency or a duty ratio of switching signals transmitted to the bridge converter to regulate the second AC voltage signal.

18. The charging pad of claim 15, wherein the at least one second frequency coil is configured to receive the combined voltage signal and resonate at the second frequency to transmit the received second AC voltage signal having the second frequency to a second receiver device of the plurality of receiver devices.

19. The charging pad of claim 18, further comprising a first controller operatively coupled to the second receiver device and the amplifier, wherein the first controller is configured to control a voltage gain of the amplifier.

20. A charging pad, comprising:

a power drive unit comprising:

a first oscillator configured to generate a first AC voltage signal having a first frequency;

a second oscillator configured to generate a second AC voltage signal having a second frequency;

an adder operatively coupled to the first oscillator and the second oscillator, wherein the adder is configured to:
combine the first AC voltage signal and the second AC voltage signal to produce a combined voltage signal; and
amplify the combined voltage signal having the first frequency and the second frequency; and
a transmitting unit operatively coupled to the power drive unit and comprising:
at least one first frequency coil tuned to the first frequency and configured to receive the amplified combined voltage signal and transmit the first AC voltage signal having the first frequency; and
at least one second frequency coil tuned to the second frequency and configured to receive the amplified combined voltage signal and transmit the second AC voltage signal having the second frequency.

\* \* \* \* \*